UNITED STATES PATENT OFFICE.

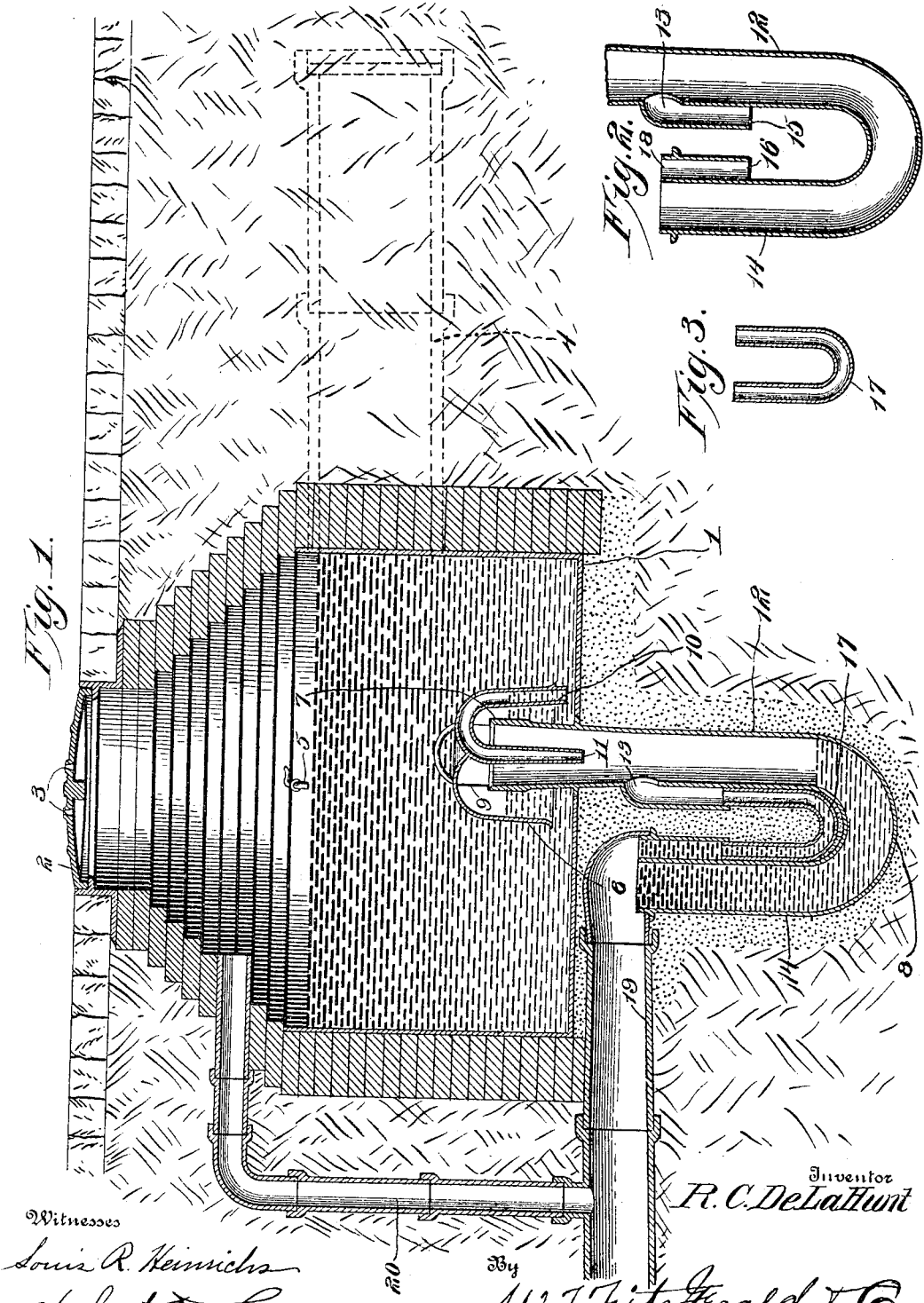

REVERDY CLEMENT DE LA HUNT, OF CEDAR RAPIDS, IOWA.

FLUSHING-TANK FOR SEWERS.

No. 818,875.  Specification of Letters Patent.  Patented April 24, 1906.

Application filed July 28, 1905. Serial No. 271,639.

*To all whom it may concern:*

Be it known that I, REVERDY CLEMENT DE LA HUNT, a citizen of the United States, residing at Cedar Rapids, in the county of Linn and State of Iowa, have invented certain new and useful Improvements in Flushing-Tanks for Sewers; and I do hereby declare the following to be a full, clear, and exact description of the invention, such as will enable others skilled in the art to which it appertains to make and use the same.

My invention relates to flushing-tanks for sewers and the like, and is more particularly an improvement on the subject-matter of another application filed by me in the United States Patent Office. Its object is to provide a device of this character adapted to operate automatically at predetermined periods to discharge the contents of the tank from its outlet.

Another object is to employ an arrangement of siphons for controlling the operation of the apparatus.

A still further object is to provide means whereby all portions of the flushing-tank are restored to their initial conditions after each flushing operation, and thereby insure accurate results at all times and without requiring the attention of operators.

A still further object is to provide means whereby the siphons of the apparatus can be adjusted for use in tanks of different depths, thereby permitting the tanks to be placed and accurately operated at various distances below the surface of the ground without requiring the construction of a different apparatus for each size of tank.

My improved flushing apparatus is especially adapted for use in connection with sewers, whether the same be shallow or of considerable depth, and it consists of a tank or receptacle for water having a trap-like outlet in the bottom thereof which establishes communication between the tank and the sewer-pipes. The trap projects some distance above the bottom of the tank and is capped by a bell, the edge of which is supported a short distance above the tank-bottom. This bell contains a siphon, the short leg of which has its inlet end between the edge of the bell and the bottom of the tank, while the long leg thereof projects into the trap. Each member of the trap has a sleeve, and adjustably mounted within the sleeves is a secondary trap or by-pass. The sleeve of the inlet member of the trap communicates with the interior of said member, while the other sleeve is adapted to open into the sewer-pipes at the same level with the trap. Water is continually supplied to the tank in any suitable manner, and when it reaches a predetermined level the weight thereof becomes sufficient to force the air within the bell down through the secondary trap, and thereby permits the water to flow into the long member of the trap and then outward into the sewer-pipe. After this flow of water ceases that portion thereof contained within the trap will fall to a level below the outlet end of the trap; but this level will be gradually raised because of the action of the siphon, which continues to draw water out of the tank and discharge it into the trap, thereby restoring the level of the water to its normal condition, and after the water within the tank has passed below the inlet end of the siphon the siphonic action is of course broken, and the water entering the tank through the inlet will then slowly rise until the action above mentioned can be repeated automatically.

The invention further consists in providing a secondary trap or by-pass which can be adjusted so that the column of water contained in the outlet leg or member thereof is equal to the depth of the water contained within the tank. The apparatus is therefore adjustable for use with tanks of different depths and will automatically operate at predetermined periods, said periods being regulated by the length of the secondary trap and by the rapidity with which the tank is supplied with water.

In the accompanying drawings I have shown the preferred form of my invention.

In said drawings, Figure 1 is a section through the tank and showing the condition of the parts just prior to the flushing operation. Fig. 2 is an enlarged section through the main trap of the apparatus, and Fig. 3 is a similar view of the secondary trap detached.

Referring to the figures by numerals of references, 1 is a tank of any suitable construction and which has the upper end thereof closed by a cover 2, having air-inlets 3, whereby the atmospheric pressure within the tank may be continually maintained. This cover is adapted to be placed on a level with the ground and can be located, of course, at any suitable distance from the bottom of the tank, said distance depending upon the distance between the sewer-pipes and the level of the ground. Where the tank is necessarily a shallow one, the capacity thereof can be materially increased by extending tiles 4 therefrom, as shown by dotted lines, said tiles communicating with the interior of the tank at a point below the water-level which must be reached within the tank. Any suitable water-inlet, such as a pipe 5, extends into the tank, preferably above a bell 6, which is placed directly over one end 7 of a trap 8. This end 7 of the trap projects into the tank some distance from the bottom thereof, and the bell is supported thereon in any preferred manner, as by means of brackets 9, interposed between the bell and trap. Formed within one side of the bell is a short leg 10 of a siphon, said leg having its inlet ends disposed below the bell and close to the bottom of the tank. The other member 11 of the siphon projects downward a suitable distance into the inlet end 7 of the trap. The long leg 12 of trap 8 has an outlet-opening 13 at a point in alinement with the outlet end of the short leg 14 of the trap, and extending from this outlet-opening is a sleeve 15. Another sleeve 16 is formed upon the leg 14 of the trap and has an outlet flush with the outlet end of the leg 14. Slidably mounted within these two sleeves 15 and 16 is a U-shaped secondary trap or by-pass 17, which can be adjusted longitudinally within the sleeves, so that the distance between the outlet end 18 of the sleeve 16 and the bottom of trap 17, plus the depth of the water in the bell, will be equal to the distance from the bottom of the tank 1 to the highest water-level therein. The leg 14 and the sleeve 16 of the trap open into the sewer-pipe 19, and this pipe is preferably connected by a pipe 20 with the upper portion of the tank 1, so that the warm gases within the pipe 19 will be discharged into the tank and prevent the water from freezing. This pipe also permits the inspection of the sewer-pipe.

From the foregoing description it is believed that the operation of the flushing apparatus will be fully understood. In building the tank the same is of course necessarily placed between the surface of the ground and the sewer-pipe, and if this pipe is but a short distance from the surface only a very shallow tank can be employed. Under other conditions, however, tanks of considerable depth may be utilized. As the distance between the bottom of the tank and its higest water-level is an important factor to be considered in the operation of the apparatus, it is necessary to utilize the adjustable secondary trap in order to construct discharging means of this character which can be used with tanks of different depths.

In Fig. 1 I have shown the secondary trap adjusted so that the distance from the outlet 18 to the bottom of the secondary trap, plus the depth of water in the bell, is equal to the depth of the water within the tank when at its highest level. When the water reaches this point, the weight thereof will be sufficient to force the air which is trapped in bell 6 down through the leg 12 of trap 8 into the outlet 13 and through the secondary trap 17 to the outlet 18. The water will therefore be free to rise within the bell and will flow outward over the inlet end 7 of the trap 8 and thence into the pipe 19. As soon as the level of the water within the tank falls to the level of the inlet end 7 of trap 8 the weight of the water within the long leg 12 of the trap will cause an overflow at the discharge end of said trap and the water in the leg 12 will drop down toward the bottom of said trap and finally reassume a position within both the legs 12 and 14 with its level below the outlet end of the trap 8. This small quantity of water in the trap would not, of course, offer sufficient resistance to the water within the tank when subsequently filled to cause the flushing operation to occur at the proper period, and therefore to leave the water at this level would seriously interfere with the proper operation of the apparatus. It is therefore necessary to automatically raise the level of the water within the trap 8, so that it will be flush with the outlet end of said trap. This result is attained by the use of the siphon contained within bell 6. As soon as the water ceases to flow over the end of trap 8 and drops to the low position within the trap, as above mentioned, the siphon which was filled simultaneously with the discharge of the water into the trap 8 continues to act until the water within the tank is withdrawn to a level below the bell 6. A sufficient quantity of water will be discharged into the trap in this manner to restore the water therein to the proper level, and when the water within the tank is drawn off so that its level comes below the inlet end of the siphon the siphonic action will be interrupted and the further discharge of water into the trap will be stopped. The water which has been continuously flowing into the tank from the pipe 5 will thus be free to rise therein and reassume its former level, after which the operation hereinbefore described will be repeated. It will be seen that by means of this apparatus the flushing action is automatic and the parts of the apparatus being operated by natural forces cannot get out of order from any cause and do not require any attention. By regulating the discharge of water from the pipe 5 the periods at which the tank is emptied can be readily regulated. Atmospheric pressure within the tank is preserved at all times, because the cover 2 has air-inlets 3, and therefore there is no danger of an insufficient supply of air being trapped within the bell 6.

The bell 6, with its siphon 10 opening into a trap 8, constitutes the subject-matter of another application filed by me in the United States Patent Office.

Having thus fully described my invention, what I claim as new, and desire to secure by Letters Patent, is—

1. In an apparatus of the character described the combination with a tank having a water-inlet; of an outlet-trap extending into the tank, a bell upon the inlet end of the trap, a siphon having both of its ends below the bell and one of said ends within the trap, and an adjustable device connecting the legs of the trap and constituting a means of communication between said portions.

2. In a flushing apparatus the combination with a tank open to atmospheric pressure and having a water-inlet; of an outlet-trap projecting into the tank, an adjustable secondary trap communicating with the inlet portion of the outlet-trap, means upon the outlet-trap constituting an air-trap to retard the discharge of water from the tank into the outlet-trap, and a siphon for supplying water to the outlet-trap from levels below the end thereof.

3. In a flushing apparatus the combination with a tank having a water-inlet; of an outlet-trap projecting into the tank and having its inlet end above the bottom of the tank, air-trapping means surrounding the inlet end of the trap for retarding the overflow of water from the tank into the trap, a siphon for feeding water to the trap from levels below the air-trapping means, and an adjustable secondary trap connecting opposite portions of the outlet-trap.

4. The combination with a trap having an opening in one leg thereof; of a longitudinally-adjustable secondary trap interposed between the legs of the first-mentioned trap and communicating at its ends with said opening and with the outlet end of the trap, respectively.

5. In a flushing apparatus an outlet-trap having an aperture in the long leg thereof and a sleeve communicating with said outlet, a sleeve upon the short leg of the trap and a by-pass mounted at its ends within the sleeves.

6. A controlling apparatus for flushing-tanks comprising an outlet-trap having legs of different lengths, a longitudinally-adjustable secondary trap connecting said legs, a bell upon and surrounding the inlet or long leg of the trap, and a siphon having its opposite ends within the trap and below the bell, respectively.

In testimony whereof I have signed my name to this specification in the presence of two subscribing witnesses.

REVERDY CLEMENT DE LA HUNT.

Witnesses:
  CLARA DE LA HUNT,
  MARY WILLIAMS.